United States Patent
Schuehler et al.

(10) Patent No.: US 11,346,915 B2
(45) Date of Patent: May 31, 2022

(54) DEVICE AND METHOD FOR DETERMINING THE POSITION OF A TRANSMITTER RELATIVE TO A DETECTION REGION

(71) Applicant: Fraunhofer-Gesellschaft zur Foerderung der angewandten Forschung e.V., Munich (DE)

(72) Inventors: Mario Schuehler, Effeltrich (DE); Lars Weisgerber, Ebersbach-Neugersdorf (DE); Johannes Arendt, Erlangen (DE); Rainer Wansch, Baiersdorf (DE); Heinrich Milosiu, Erlangen (DE); Frank Oehler, Adelsdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 635 days.

(21) Appl. No.: 16/101,348

(22) Filed: Aug. 10, 2018

(65) Prior Publication Data

US 2018/0348329 A1 Dec. 6, 2018

Related U.S. Application Data

(63) Continuation of application No. PCT/EP2017/052938, filed on Feb. 9, 2017.

(30) Foreign Application Priority Data

Feb. 12, 2016 (DE) .................... 10 2016 202 203.2
Jul. 20, 2016 (DE) .................... 10 2016 213 240.7

(51) Int. Cl.
*G01S 3/28* (2006.01)
*G01S 7/03* (2006.01)
(Continued)

(52) U.S. Cl.
CPC .................. *G01S 3/28* (2013.01); *G01S 3/14* (2013.01); *G01S 7/03* (2013.01); *G01S 13/75* (2013.01);
(Continued)

(58) Field of Classification Search
CPC ..... G01S 3/28; G01S 3/16; G01S 3/22; G01S 3/32; G01S 3/235; G01S 3/72; G01S 3/14;
(Continued)

(56) References Cited

U.S. PATENT DOCUMENTS

| 4,638,317 A | 1/1987 | Evans |
| 7,170,412 B2 * | 1/2007 | Knox ........................ G01S 3/32 340/572.1 |

(Continued)

FOREIGN PATENT DOCUMENTS

| CN | 102062852 A | 5/2011 |
| DE | 102008012534 A1 | 9/2009 |

(Continued)

OTHER PUBLICATIONS

Kathrein-Werke KG, UHF RFID Ultra Low Range-Antenne (ULORA), http://www.kathrein.de, datasheet, 6 pages, 2010.
(Continued)

*Primary Examiner* — Cassi J Galt
(74) *Attorney, Agent, or Firm* — Perkins Coie LLP; Michael A. Glenn

(57) ABSTRACT

What is disclosed is a device for determining a piece of information on a position of a transmitter, having an antenna device and a data processing device. The antenna device receives signals emanating from the transmitter and has a distinguished directional characteristic which relates to a set of spatially different receive sensitivities of the antenna device. The distinguished directional characteristic has a sensitivity minimum associated to a spatial detection region.
(Continued)

The data processing device evaluates the signals received from the antenna device with the distinguished directional characteristic, as regards the position of the transmitter relative to the detection region. In addition, a corresponding method is disclosed.

13 Claims, 8 Drawing Sheets

(51) Int. Cl.
  *G06K 7/10* (2006.01)
  *G01S 3/14* (2006.01)
  *G01S 13/75* (2006.01)
  *H01Q 25/02* (2006.01)
  *H01Q 21/29* (2006.01)
  *H04B 7/04* (2017.01)
  *H01Q 1/22* (2006.01)
  *H04B 17/318* (2015.01)
  *H04B 7/0408* (2017.01)

(52) U.S. Cl.
  CPC ......... *G06K 7/10356* (2013.01); *H01Q 21/29* (2013.01); *H01Q 25/02* (2013.01); *H04B 7/0408* (2013.01); *H04B 17/318* (2015.01); *H01Q 1/2208* (2013.01)

(58) Field of Classification Search
  CPC ............ G01S 7/03; G01S 13/75; G01S 3/043; H01Q 25/02; H01Q 21/29; H01Q 1/2216; H01Q 1/2208; G06K 7/10356; G06K 7/10435; H04B 7/0408; B65G 2203/046
  See application file for complete search history.

(56) References Cited

U.S. PATENT DOCUMENTS

| | | | | |
|---|---|---|---|---|
| 8,456,281 | B2* | 6/2013 | Nogami | G01S 3/14 340/10.1 |
| 8,854,212 | B2* | 10/2014 | Goidas | G06K 7/10435 340/572.1 |
| 2010/0245047 | A1 | 9/2010 | Nogami | |
| 2011/0068980 | A1 | 3/2011 | Vered et al. | |
| 2011/0169613 | A1 | 7/2011 | Chen et al. | |

FOREIGN PATENT DOCUMENTS

| | | |
|---|---|---|
| JP | S50-076774 U | 7/1975 |
| JP | H05240935 A | 9/1993 |
| JP | 2009157892 A | 7/2009 |
| JP | 2011028470 A | 2/2011 |
| JP | 2013517689 A | 5/2013 |
| JP | 2013521737 A | 6/2013 |
| JP | 2014122838 A | 7/2014 |
| WO | 2009147662 A1 | 12/2009 |
| WO | 2011088009 A1 | 7/2011 |
| WO | 2011110882 A1 | 9/2011 |

OTHER PUBLICATIONS

Kathrein-Werke KG, UHF RFID Low Range-Antenne (LoRa) Polarisation, data sheet, Firma Kathrein, 4 pages, 2012.
Kaiser, Michael, "UHF RFID System der 3. Generation", Kathrein RFID KRAI Solutions EuroID, 2013, 14 pages.
Volmer, C. et al., "An Eigen-Analysis of Compact Antenna Arrays and Its Application to Port Decoupling", IEEE Transactions on Antennas and Propagation; vol. 56; No. 2, Feb. 2008, pp. 360-370.
Yokoyama, Shunya et al., "Suggestion for in-door positioning information estimate system using mono-pulse goniometry", Technical Report of the Institute of Electronics, Information and Communication Engineering, Japan, The Institute of Electronics, Information and Communication Engineering, Jun. 25, 2015, vol. 115 No. 123, pp. 125-128, ISSN 0913-5685, Jun. 25, 2015, pp. 125-128.

* cited by examiner

DEVICE AND METHOD FOR DETERMINING THE POSITION OF A TRANSMITTER RELATIVE TO A DETECTION REGION

CROSS-REFERENCE TO RELATED APPLICATION

This application is a continuation of copending International Application No. PCT/EP2017/052938, filed Feb. 9, 2017, which is incorporated herein in its entirety by this reference thereto, which claims priority from German Application No. 10 2016 202 203.2, filed Feb. 12, 2016, and from German Application No. 10 2016 213 240.7, filed Jul. 20, 2016, which are each incorporated herein in its entirety by this reference thereto.

BACKGROUND OF THE INVENTION

The invention relates to a device for determining at least one piece of information on a position of at least one transmitter. In addition, the invention relates to a method for establishing a piece of information on a position of a transmitter relative to a detection region.

In the field of logistics and production technology, radio-frequency transponders ("radio-frequency identification" (RFID) transponders or RFID tags) allowing identification of objects are used more frequently. These transponders (here and subsequently as an alternative term for RFID transponders) are typically passive so that they have to be excited by a radio-frequency electromagnetic field in the form of an excitation signal. The transponder uses this signal for energy production and returns a modulated signal to the RFID reader (RFID reader or, in the following, simply reader is an alternative term) in response to the excitation. The response signal includes information of the transponder that can be evaluated by the reader. This means that an object can be clearly identified and allocated via a transponder.

RFID transponders are applied in, among other things, flow control of goods or work pieces. Thus, it is important to read out the transponders at a certain position along the transport path. Conveyor belts, for example, can be regulated as regards their speed or stopped by this, doors be opened automatically for authorized persons or import and export of objects be inspected.

Typically, several objects are arranged one behind the other so that the transponders thereof are practically read out simultaneously. Associating a specific transponder to a certain position can consequently not always be guaranteed and transponders may be mixed up. For object flow control, however, unambiguous identification at a predetermined position is entailed. Thus, two pieces of data are established: identifying the object and identifying the position of the object or at least the point in time of when a selected position is taken or passed by the object.

Modern systems, as are used for passing gates or in transport units, frequently consist of an RFID reader having one to four terminals (so-called ports) to which one antenna each can be connected. The radio-frequency excitation signal is sent out using the antenna or respective antenna and the response signals of the RFID transponders are received.

In RFID readers having only a single terminal, usually an antenna consisting of a single radiator is connected. This allows detecting transponders, but not establishing unambiguous directional information.

In RFID readers having several ports, one antenna consisting of a single radiator as an antenna element is connected per port. Switching between the antennas typically takes place sequentially within the reader by feeding the signals applied to the ports to further evaluation. The position of the transponders can be deduced from a spatial distribution of the antennas. However, the directional information is very imprecise or ambiguous. In addition, distributing the antennas entails large space requirements and, consequently, high installation complexity.

In the UHF range (frequency range from 860 MHz to 960 MHz for global usage pursuant to "EPC Radio-Frequency Identity Protocols Class-1 Generation-2 UHF RFID Protocol for Communications at 860 MHz-960 MHz"), one potential solution for flow control is using low-range antennas. This allows detecting only such RFID transponders located within a small distance to the antenna, in particular located at a distance of only a few centimeters from it (see, for example, [1], [2]). When installing the same, it should be kept in mind that the transponders to be recognized really move past the antenna at a very small distance. This may entail intervening considerably into an established process in order to identify the transponders and be able to control the flow thereof.

Alternatively, RFID transponders and RFID readers for the RF range (frequency 13.56 MHz pursuant to "EPC Radio-Frequency Identity Protocols EP Class-1 HF RFID Air Interface Protocol for Communications at 13.56 MH") may be used which are typically used in near-field applications, like electronic payment processes. The range here is limited to centimeters. In addition, special radio-frequency RFID transponders are used. An object equipped already with a conventional UHF-RFID transponder consequently would have to take along additionally such an RF-RFID transponder in order to be detected along the supply chain, like when passing gates. This entails higher costs and greater logistic complexity.

The object underlying the present invention is proposing a device and a method which allow recognizing whether and, advantageously, when an object passes a predetermined position and which—at least partly—avoid the disadvantages of the known technology.

SUMMARY

According to an embodiment, a device for determining at least one piece of information on a position of at least one transmitter may have: an antenna device and a data processing device, wherein the antenna device is configured to receive signals emanating from the transmitter, wherein the antenna device has at least a distinguished directional characteristic, wherein the distinguished directional characteristic relates to a set of spatially different receive sensitivities of the antenna device, wherein the distinguished directional characteristic has at least one sensitivity minimum associated to a spatial detection region, and wherein the data processing device is configured to evaluate at least the signals received from the antenna device with the distinguished directional characteristic, as regards the position of the transmitter relative to the detection region.

Another embodiment may have a method for establishing a piece of information on a position of a transmitter relative to a detection region, wherein signals are received, emanating from the transmitter with a distinguished directional characteristic of an antenna device, and wherein the distinguished directional characteristic has a sensitivity minimum for receiving signals in the detection region.

The object of the invention is achieved by a device for determining at least one piece of information on a position of at least one transmitter. Thus, the device comprises an antenna device and a data processing device. The antenna device is configured to receive signals emanating from the transmitter. The antenna device comprises at least one distinguished or excellent directional characteristic. Thus, the distinguished directional characteristic relates to a set of spatially different receive sensitivities of the antenna device. The distinguished—alternatively also referred to as "special" or "selected"—directional characteristic comprises at least one sensitivity minimum associated to a spatial detection region. In addition, the data processing device is configured to evaluate at least the signals received from the antenna device with the distinguished directional characteristic, as regards the position of the transmitter relative to the detection region.

The inventive device comprises an antenna device having at least one distinguished directional characteristic. The directional characteristic here relates to spatially different receive sensitivities. This means that the antenna device with this directional characteristic receives signals from different spatial regions at different intensities. In the case of the distinguished directional characteristic, the existence of a minimum regarding signal receiving is provided for in a spatial detection region. This means that the signals of a transmitter located within this detection region are received by the antenna device only very weakly or not at all. When the transmitter transmits its signals with equal output power and moves through the detection region, the field strength of the signals received will decrease significantly or even approximate zero. Thus, the data processing device is configured to evaluate the signals received as to which position the transmitter is located in relative to the detection region. In the easiest case, a minimum of field strength of the signal received indicates that the transmitter is located within the detection region. With greater a field strength, the transmitter is located outside the detection region.

For establishing the position, in one implementation, using history data, i.e. stored measuring values, is provided for so that the point in time when the transmitter has passed the detection region is established from the decrease and subsequent increase in the signal amplitude.

In one implementation, the antenna device comprises several (at least two) different directional characteristics which each relate to a set of spatially different receive sensitivities of the antenna device. One of the directional characteristics here is the distinguished directional characteristic with the mentioned sensitivity minimum. In addition, the device comprises a control device configured to switch the directional characteristics for receiving signals emanating from the transmitter.

Particularly, in one implementation, the control device also switches the distinguished directional characteristic.

In an alternative implementation, the antenna device comprises only one directional characteristic which in this case also is the distinguished directional characteristic.

The following implementation refers to a further directional characteristic to be present apart from the distinguished directional characteristic.

In this implementation, the control device is configured to switch at least one comparative directional characteristic of the antenna device. The comparative directional characteristic thus is another directional characteristic comprising a sensitivity maximum in the spatial detection regions. With this comparative directional characteristic, the signals received of the transmitter comprise higher a signal amplitude when the transmitter is located within the detection region, and lower an amplitude when the transmitter is located outside the detection region. Finally, the data processing device is configured to inspect, starting from the signals received from the antenna device with the comparative directional characteristic, the information on the position of the transmitter relative to the detection region. Actually, establishing the position of the transmitter takes place using the signals measured with the distinguished directional characteristic. The results are then inspected using the signals received with the comparative directional characteristic. This means that it is checked whether the respective statements on the positions match.

In one implementation, the data processing device is configured to evaluate signals received from the antenna device at different times as regards the position of the transmitter relative to the detection region. In this implementation, signals are received at different times and the waveform of the signals or the data established from this evaluated relative to the position of the transmitter. Exemplarily, intrapolation may take place as to at which time the transmitter has passed the detection region. Since the detection region is connected to a sensitivity minimum, a case may result where the amplitude of the signals received decreases and then increases again. This means that the transmitter was located within the detection region between the decrease and the increase.

In one implementation, the transmitter moves only in one direction relative to the detection region. In one implementation, the direction of movement is parallel to an axis where the antenna elements of the antenna device are located. Furthermore, in one implementation, it is provided for the transmitter to move on an axis perpendicular to the detection region.

When the transmitter moves only on a known path relative to the detection region, this makes evaluation of the signals easier. In particular, a sequence of changes in the signals caused by the movement of the transmitter can be concluded for the directional characteristics. This in turn allows drawing conclusions from the signals as to the position of the transmitter. For the form mentioned of the distinguished directional characteristic above already, an amplitude decrease and then amplitude increase result. This means that the transmitter sends out the signals with equal field strength.

When, in one scenario, another transmitter follows after the transmitter mentioned, the situation may arise that the signals of the further transmitter are received, but since it is spatially located behind the transmitter mentioned at first, the signals thereof are received at a different receive sensitivity, which consequently also cause a different signal amplitude differing from the values expected for the first transmitter. The result may be jumps in the signal amplitude, for example, wherein actually a decrease in the signal amplitude has shown before that. Thus, several transmitters may be differentiated between. The invention as a whole also relates to an arrangement of the device described here and a path of the transmitter.

In another implementation, information data on the transmitter are established from the signals received. This implementation is based on the fact that RFID transponders, for example, also send out identification data with the response signals. This implementation consequently allows separating between the signals from different transmitters by the respective transmitters being identified by their own signals.

One implementation provides for the device to comprise a data storage. The data processing device here is configured to store in the data storage data associated to the signals received at different points in time. Additionally, the data processing device is configured to establish from the data stored in the data storage that point in time when the transmitter is located within the detection region and/or passes the detection region. A pattern, mentioned already, for the waveform of the signal amplitude is as follows: decrease in amplitude, reaching a minimum, increase in amplitude. This applies in case there is only one receive minimum. With an assumed constant speed of the transmitter, the time of passing may also be extrapolated.

One implementation provides for the distinguished characteristic to comprise several sensitivity minimums which are associated to different spatial detection regions. In this implementation, the directional characteristic, due to the plurality of sensitivity minimums, allows different detection regions to be monitored. Thus, on the one hand, the position of the transmitter can be localized more precisely, i.e. whether it is, for example, located between two detection regions. In addition, statements on the position of the transmitter can be verified by this. This may particularly take place in connection with the evaluation of signals having been received at different points in time.

In one implementation, the device comprises a signal processing device. Thus, the signal processing device is configured to process the signals received from the antenna device and establish a respective amplitude value of field strength of the signal received. Evaluating the signals received may be made easier using this implementation since only a value is associated to each signal. Thus, the data processing device is configured correspondingly to process the amplitude values of the signals received.

One implementation provides for the signal processing device to be an RFID reading device which generates a "received signal strength indication" value each as an amplitude value of the field strength of the signals received.

In an alternative or additional implementation, data allowing identification of the transmitter are also established from the signals received.

In one implementation, the device comprises a signal source configured to generate an excitation signal. The antenna device is configured to radiate the excitation signal. Thus, in one implementation, the signal source is part of the signal processing device and, in an alternative implementation, is a separate component. In one implementation, the signal source particularly belongs to the signal processing device implemented as an RFID reader.

One implementation provides for the detection region to be a plane. In one implementation, the detection region particularly extends only across one plane. Here, it is recognized whether the transmitter passes a plane.

In one implementation, the antenna device is implemented as a multi-beam antenna. A multi-beam antenna comprises different directional characteristics which are each characterized by a beam or main beam. These beams are, at least partly, oriented differently in space so that different spatial regions are measured with different receive sensitivities.

One implementation provides for the antenna device to comprise several antenna elements. In one implementation, the antenna elements are components of a patch antenna and, in an alternative implementation, are individual dipole antennas.

In one implementation, the antenna device comprises two antenna elements. Thus, the control device is configured to switch the two antenna elements alternatingly in an odd mode and an even mode. The two antenna elements, in one implementation, are configured to be basically equal and consequently also comprise equal characteristics as regards signal receiving. The different feeding of the antenna elements each results in different directional characteristics.

In one implementation, when feeding the antenna elements in an even mode, the result is a sensitivity maximum in a plane perpendicular to a connecting axis between the two antenna elements. Odd mode feeding generates a directional characteristic having a minimum or zero in the plane perpendicular to the connecting axis.

Consequently, in one implementation, it is provided for the antenna elements to be arranged such that the respective plane is located within the detection region. This also entails that the directional characteristic resulting in the case of odd mode feeding at the same time is the distinguished directional characteristic and that the directional characteristic resulting in the case of even mode feeding is the comparative directional characteristic.

One implementation provides for the antenna device to comprise a feed network. Thus, the feed network is configured to cause different directional characteristics of the antenna device. This relates to both transmitting and receiving signals. The feed network in one implementation is particularly configured to output the respective signal received for each directional characteristic, which means that the antenna device with several directional characteristics receives signals simultaneously.

In addition, the object of the invention is achieved by a method for establishing a piece of information on a position of a transmitter relative to a detection region. The method comprises at least receiving signals emanating from the transmitter. This takes place with a distinguished directional characteristic of an antenna device. Thus, the distinguished directional characteristic comprises a sensitivity minimum for receiving signals in the detection region.

The implementations of the devices may correspondingly also be realized by the method so that the respective discussions apply in analogy. This also applies to the reverse case so that the method may also be realized by the device.

Depending on the implementation, the present invention allows a method for associating a transponder to a fixed spatial direction. In one implementation, the method is based on the combination of a multi-beam antenna with special switchable directional characteristics and an RFID reader, which provides RSSI values for identified transponders.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
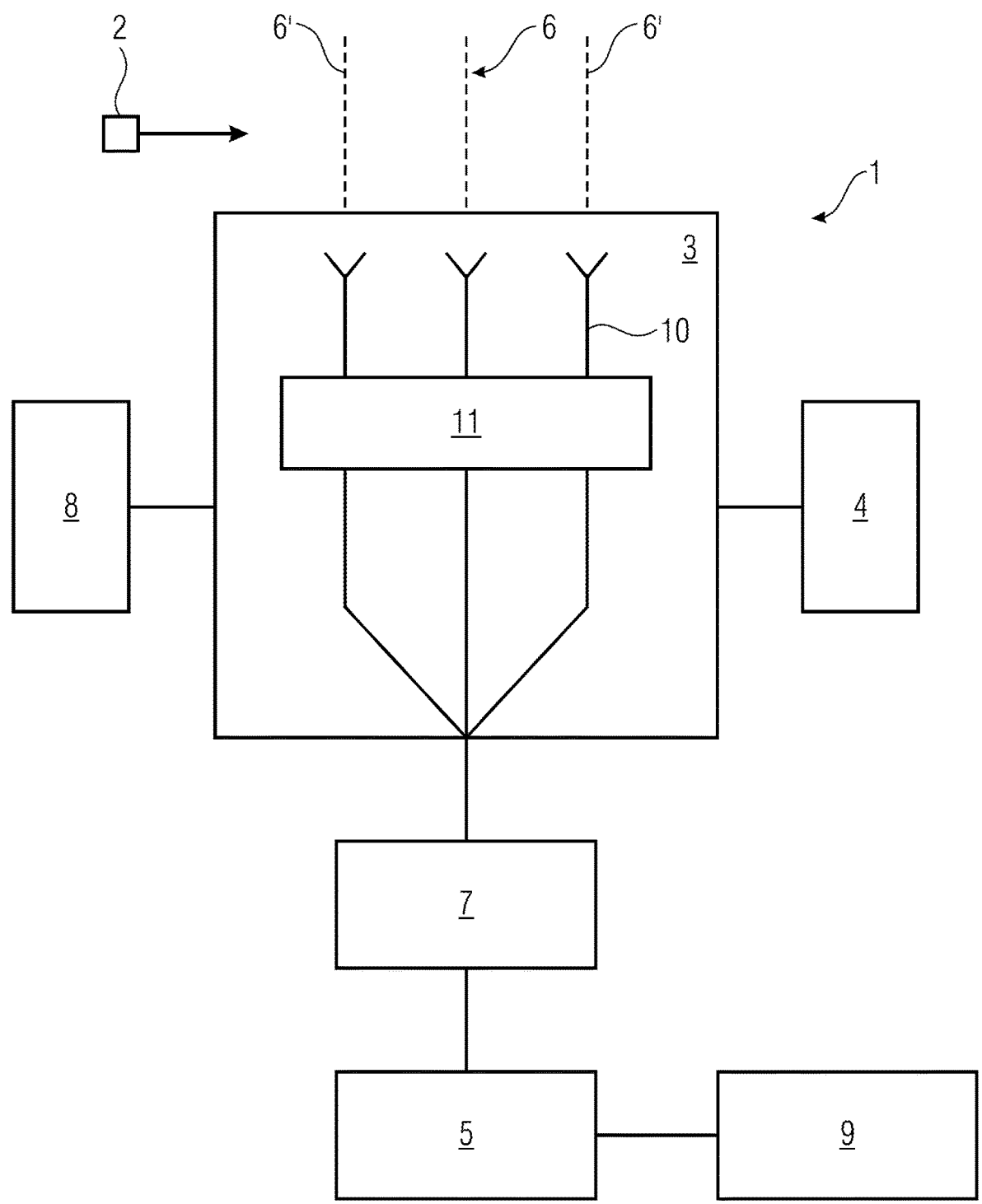
FIG. 1 shows a schematic illustration of an inventive device and the application thereof.

FIG. 1 shows an application of the inventive device 1 which, among other things, allows indicating whether and when a transmitter 2 passes a detection region 6.

Here, the device 1 comprises an antenna device 3 having at least a distinguished directional characteristic. The directional characteristic relates to a spatial distribution of the sensitivity of the antenna device 3 for receiving signals which in this case particularly emanate from the transmitter 2.

In the implementation illustrated, the antenna device 3 comprises several directional characteristics. In the exemplary implementation, there are three antenna elements 10 controlled by a control device 4 via the network 11. In one implementation, the antenna device 3 is a patch antenna. Alternatively, the antenna elements 10 are dipole antennas, monopole antennas, monopole-type antennas, chip antennas or loop antennas. One of the directional characteristics is the distinguished directional characteristic, mentioned already, which the definition region 6 is associated to.

In an alternative implementation—not illustrated—the antenna device 3 comprises only a single directional characteristic which consequently also is the distinguished directional characteristic. The implementation illustrated, having several switchable directional characteristics, will be discussed below.

The feed network 11 is provided for switching the different directional characteristics for sending out an excitation signal or receiving the signals emanating from the transmitter 2. The feed network 11 in this example represents a realization of a Butler matrix (in an alternative implementation, an eigenmode network is used) and makes available at its output the signals as have been received with the individual directional characteristics. Switching the directional characteristics consequently means that the signal having been received with the switched directional characteristic is fed to evaluation or evaluated particularly. In another implementation—not illustrated—switching the directional characteristics means that only the respective switched directional characteristic is present by directly acting on the antenna device 3, i.e. the antenna device 3 can only receive signals with the switched directional characteristic.

Processing the signals received and the data resulting from it is done by the data processing device 5. In the example shown, the data processing device 5 is connected to a signal processing device 7 which establishes a respective amplitude value of the field strength for the signals received.

When the transmitter 2 is an RFID tag, the signal processing device 7 is correspondingly configured such that it will generate as an amplitude value a so-called "received signal strength indication" (RSSI) value. In another accompanying implementation, the signal processing device 7 is also configured to extract information from the signals received—like an identification characteristic or measuring data. The signal processing device 7 may exemplarily be an RFID reader.

In an implementation—not illustrated—the data processing device 5 itself establishes a value for the amplitude of the signals received. In particular in connection with this implementation, but also independently of this, in one implementation, the data processing device 5 is a component of the antenna device 3 and consequently accommodated therein.

For applications in transmitters 2 based on RFID tags, in the embodiment shown, there is an additional signal source 8 generating excitation signals. The excitation signals are—depending on the case of application with specific directional characteristics or in a basically omnidirectional manner—output via the antenna device 3. Thus, the excitation signals may be so-called request signals using which a transmitter 2 in the form of an RFID tag is requested to set up data communication and via which the transmitter 2 obtains, if applicable, the energy used for communication. For sending out the excitation signals, in one implementation, directional characteristics are combined such that superpositioning results for sending out the signals. Conversely, the feed network 11—as has already been mentioned—allows separation into the individual directional characteristics for the signals received.

In an alternative implementation—not illustrated—the signal source 8 is a component of the signal processing device 7. This corresponds to the, in known technology, conventional implementation of RFID readers which generate the activation signals themselves.

By the antenna device 3 serving for receiving and transmitting signals, the result is that the directional characteristics do not relate only to the spatial distribution of sensitivity, but also to the transmitting characteristics of the antenna device 3.

Finally, the data processing device 5 is connected to a data storage 9 for storing data on the trajectory of the transmitter 2. Using the historic data relating to the respective positions established of the transmitter 2, the path of movement of the transmitter 2 is established and, for example when there are several transmitters, ambiguities are eliminated and the signals associated to the transmitter. Corresponding plausibility considerations are provided for this.

The selected directional characteristic here comprises a detection region 6 perpendicular to which the transmitter 2 moves in the example shown. Thus, the transmitter 2 here moves in parallel to the antenna elements 10 and perpendicular to the detection region 6. The peculiarity of the detection region 6 is that the sensitivity of the antenna device 3 in this spatial region is at a minimum. In the device 1, a signal minimum is used for determining whether the transmitter 2 passes the associated detection region 6. This means that, in the detection region 6, when the transmitter 2 is located there, no or only a very weak signal is received by the antenna device 3.

The antenna device 3 here comprises a total of three detection regions 6, 6' where a respective receive minimum is located and which the transmitter 2 passes one after the other. The reliability of detecting passing of the central detection region 6 can be increased by this.

The reliability of the measurement is particularly increased by the control device 4 setting different directional characteristics which each comprise different sensitivities and spatial associations so that measuring imprecision or ambiguities can be compensated.

In one implementation, the antenna device 3 comprises at least one further directional characteristic which exhibits a sensitivity maximum in the detection region 6. This means that the antenna device 3, with this other directional characteristic, is very sensitive to receiving signals. Thus, in this implementation, the signals of the distinguished directional characteristic and the comparative characteristic are evaluated together in order to increase the measuring precision.

Figure 2:
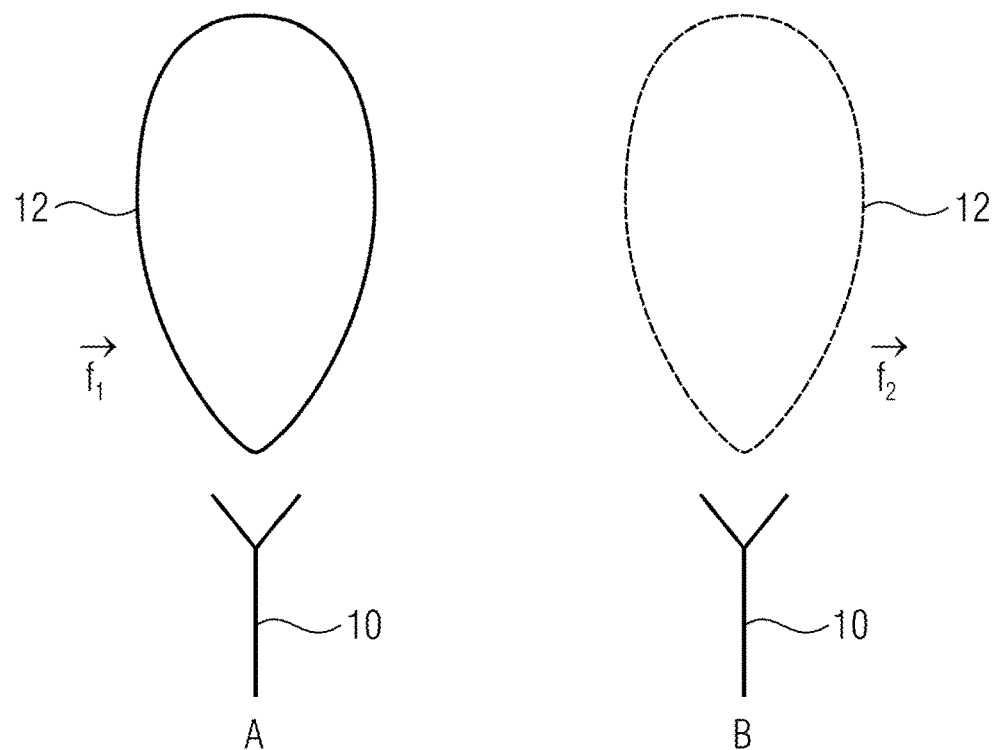
FIG. 2 shows a schematic illustration of two antenna elements of an antenna device and respective directional characteristics.

FIG. 2 shows the two antenna elements 10 (referred to by A and B) of an exemplary antenna device implemented as a multi-beam antenna. The two antenna elements 10 each comprise a beam-shaped directional characteristic 12. The two directional characteristics 12 are each described by a complex-value directional characteristic with $\vec{f}_j$=1 (or A) or j=2 (or B).

Generally, a multi-beam antenna consists of a set of n antenna elements 10 (or radiators, like dipoles) which are connected to a feed network (see FIG. 1). An antenna or antenna element is connected to each of the n outputs of the feed network.

The m inputs of the feed network which serve for outputting the signals received from the antenna elements 10 or feeding the HF signals to be sent out via the antenna elements 10 in one implementation correspond to a certain directional characteristic $\vec{C}_i$ which is defined as follows:

$$\vec{C}_i = \vec{C}_i(\vec{\omega}) = \vec{C}_i(\phi, \theta) = \begin{pmatrix} C_i^{(co)} \\ C_i^{(cross)} \end{pmatrix} \text{ with } i = 1, \ldots m \quad (1)$$

Thus, a co-polarized component $C_i^{(co)}$ and a cross-polarized component $C_i^{(cross)}$ each are given here.

Figure 3:
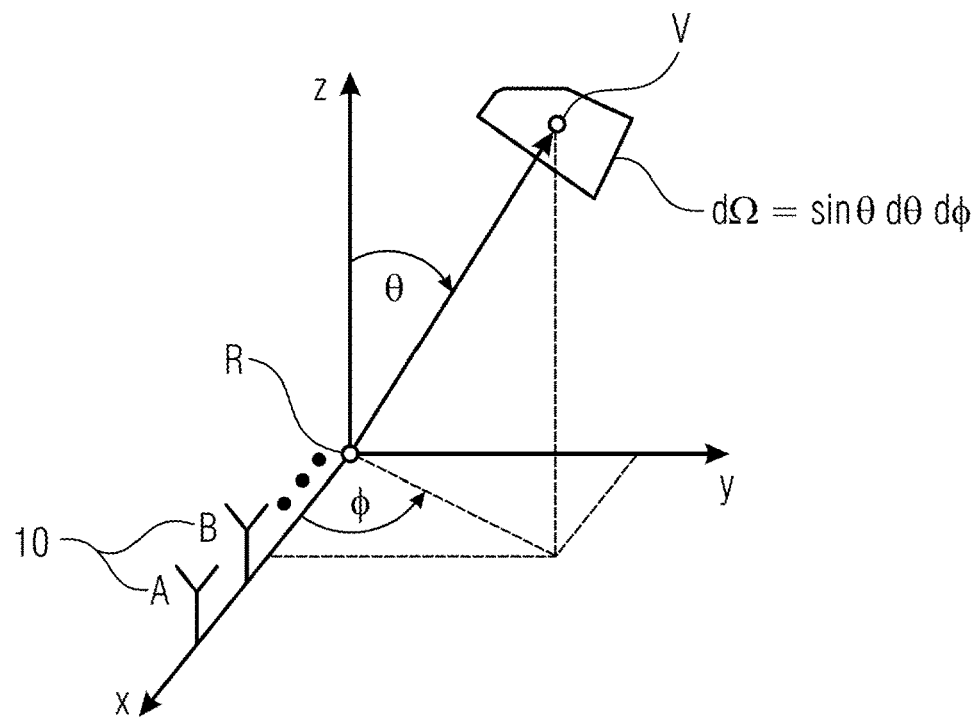
FIG. 3 shows a coordinate system for describing the antenna elements of FIG. 2.

FIG. 3 shows a coordinate system having three axes x, y and z and the reference point R at the origin of the coordinate system. The two antenna elements 10 (A and B) in the example illustrated are arranged along the x axis. A point of observation V is described by an azimuth angle φ in the x-y plane and a co-elevation angle θ relative to the z axis. The following area is to be considered here: dΩ=sin θ*dθ*dφ.

For associating a transmitter or, for example, particularly an RFID transponder to a certain direction, the directional characteristics $\vec{C}_i$ of the antenna device comprise specific features. The two-element antenna array of FIG. 2 is to be considered here.

Relating to the point of reference R in accordance with FIG. 3 where the coordinate origin is placed for reasons of simplicity, both antenna elements 10 (i.e. A and B) each exhibit the (complex) radiation characteristic mentioned:

$$\vec{f}_j = \begin{pmatrix} f_j^{(co)} \\ f_j^{(cross)} \end{pmatrix} \text{ with } j = 1, \ldots n \quad (2)$$

The so-called radiation matrix $\hat{H}$ (cf. [3]) can be established from this, the components of which are given by the following formula:

$$\tilde{H}_{pj} = \frac{1}{4\pi} \int_\Omega \vec{f}_p^H \vec{f}_j d\Omega \text{ with } \{p, j\} = 1, \ldots, n \quad (3)$$

Since the radiation matrix $\hat{H}$ is a Hermite matrix, it can be diagonalized. What results is:

$$\hat{H} = \hat{Q}\hat{V}\hat{Q}^H \text{ with } \hat{V}=\text{diag}\{\lambda_1, \ldots, \lambda_n\} \quad (4)$$

Equation (4) describes the eigenvalue decomposition of the radiation matrix $\hat{H}$. Thus, each column in $\hat{Q}$ represents one of the n eigenvectors $\vec{q}_j$ and each main diagonal element in $\hat{V}$ describes the respective eigenvalue $\lambda_j$.

The eigenvectors $\vec{q}_j$ describe the fundamental excitation vectors of the antenna device which in this case is an antenna array with the antenna elements. The eigenvectors $\vec{q}_j$ are orthogonal in pairs in case there are no eigenvalues $\lambda_j$ occurring several times. When eigenvalues $\lambda_j$ occur several times, an orthonormal basis has to be found for these, the basis vectors of which are mutually orthogonal.

In addition, the eigenvectors $\vec{q}_j$ comprise a length of one. The eigenvectors are accompanied by certain directional characteristics:

$$\vec{C}_j^{(m)} = \begin{pmatrix} C_j^{(m,co)} \\ C_j^{(m,cross)} \end{pmatrix} \quad (5)$$

which are mutually orthogonal.
This means that the following applies:

$$\oint (\vec{C}_p^{(m)})^H \vec{C}_j^{(m)} = 0, \text{ if } p \neq j. \quad (6)$$

The eigenvectors $\hat{Q}$ represent a special orthonormal basis of the potential feed vectors. However, other orthonormal bases may also be established so that the feed network need not necessarily be an eigenmode network. At least one zero forms in one of the directional characteristics along a certain direction.

For an array consisting of two equal antenna elements (see FIG. 2) with equal orientation, the following eigenvectors result:

$$\tilde{Q} = \frac{1}{\sqrt{2}} \begin{pmatrix} 1 & 1 \\ 1 & -1 \end{pmatrix} \quad (7)$$

The antenna elements 10 (like dipoles) are fed either in an even mode (1/√2 and 1/√2) or in an odd mode (1/√2 und −1/√2).

Figure 4:
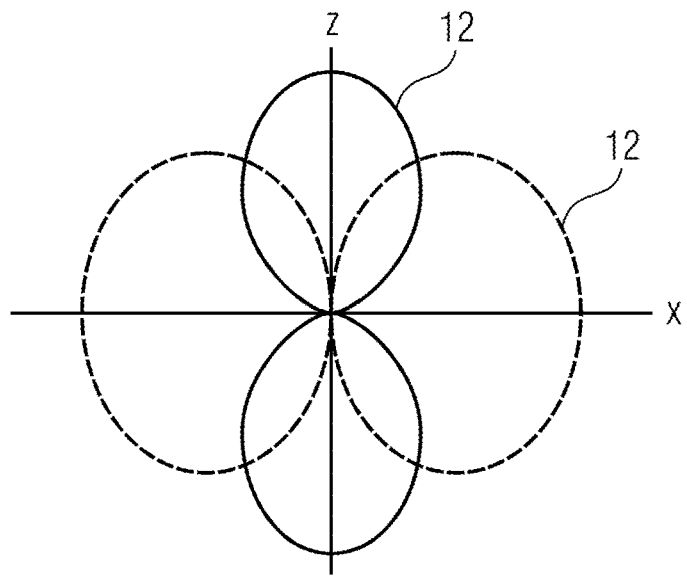
FIG. 4 shows an illustration of the directional characteristics resulting in the two antenna elements of FIG. 2 in an even mode and an odd mode.

As far as magnitude is concerned, the resulting directional characteristics are shown in FIG. 4 in a qualitative manner for the x-z plane. The directional characteristic 12 for an even mode is represented by continuous lines and that for the odd mode by broken lines. The directional characteristics illustrated particularly result from an eigenmode network.

When feeding in an even mode, the result is a maximum perpendicular to the array which is formed from the two equal and equally oriented antenna elements. The maximum is located in the z direction or at a co-elevation angle of θ=0°.

However, in an odd mode, a minimum or zero forms at this position. The zero or closest environment thereof is narrow compared to the environment of the maximum in an even mode, since the gradient relative to the co-elevation angle θ increases, as far as its magnitude is concerned, strongly in the environment of the zero.

A radio signal impinging on the array of the antenna device from the direction of the zero, will consequently rarely be received, or not at all, in an odd mode, whereas, in an even mode, the receive signal is maximum. The direction of incidence may thus be deduced from the signal levels measured in the even and odd modes.

Figure 5:
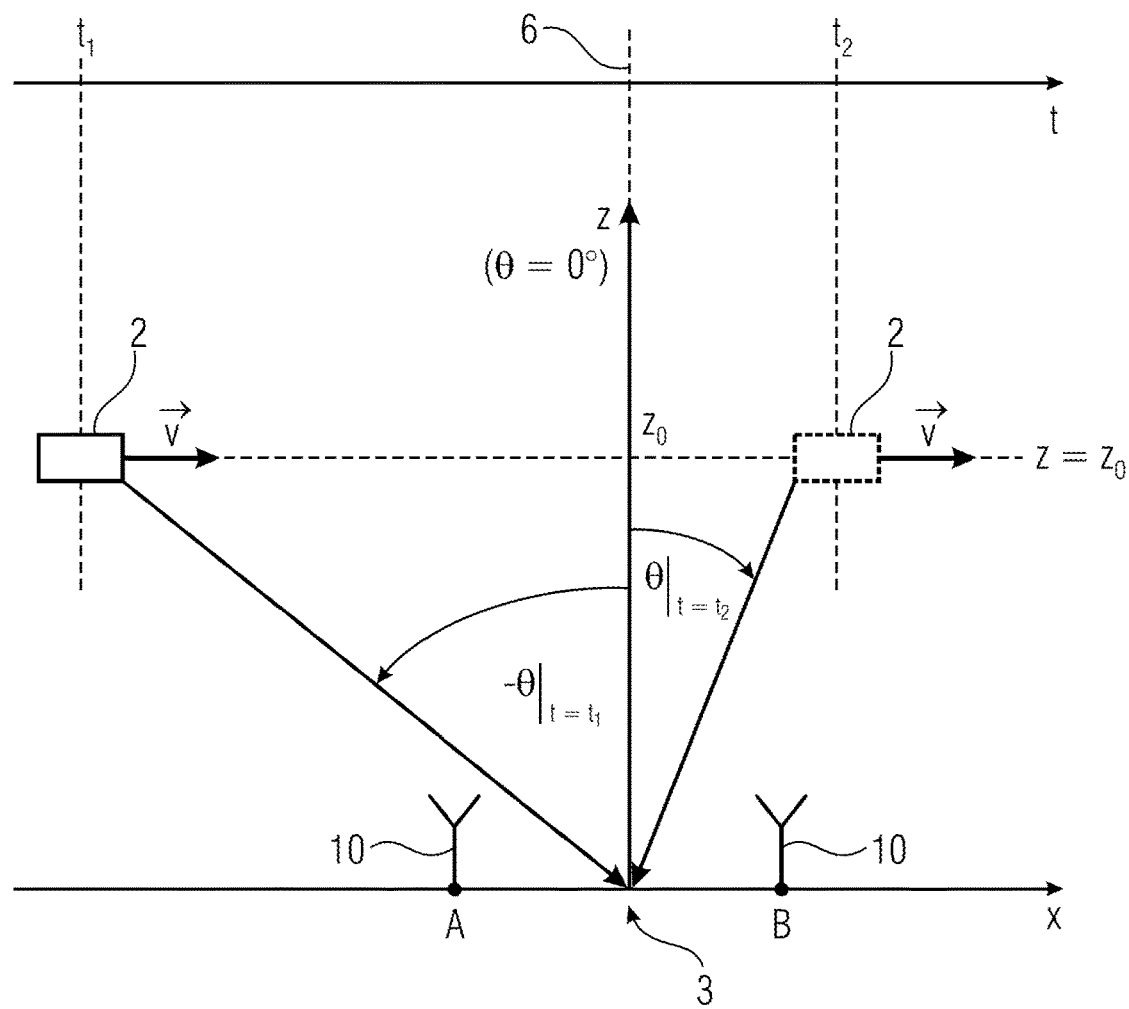
FIG. 5 shows a schematic illustration of determining the position of a transmitter relative to the antenna device with the antenna elements of FIG. 2.

FIG. 5 shows a scenario where an object with an RFID transponder as a transmitter 2 is transported at a constant speed (v) in parallel to the x axis. The antenna array formed from the two antenna elements 10 of the antenna device 3 is centered in the origin of the coordinate system and oriented such that the zero of the receive sensitivity in the odd mode occurs along the z axis θ=0°. This zero consequently is the detection region 6. In dependence on the position of the transponder 2 relative to the antenna device 3, the received signal of the individual modes will vary since the angle of incidence is a function of time.

The position of the transponder in the x direction can be associated to a time t. The two positions of the transmitter 2 at the time t1 and, thus, before the detection region 6, and at the time t2, and, thus, after passing the detection region 6 are illustrated. The respective angle of incidence θ as the angle of the incident response signal (indicated by the arrows, starting from the transmitter 2) relative to the z axis thus varies over time t.

Figure 6:
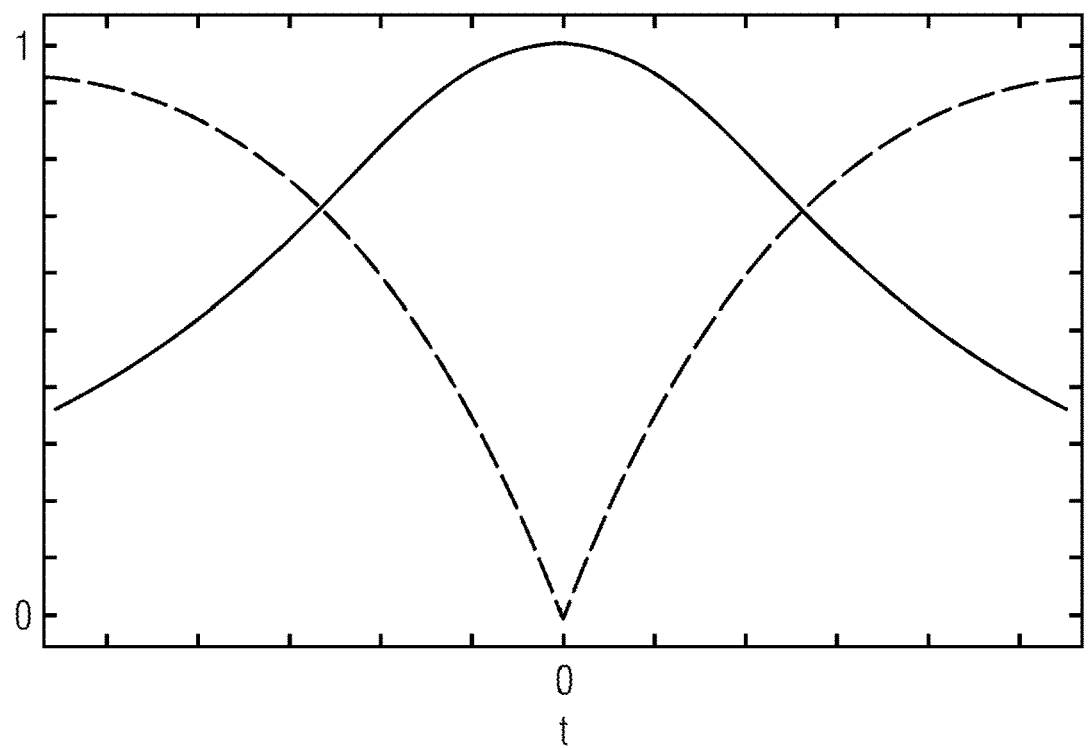
FIG. 6 shows a schematic illustration of the waveforms of the amplitudes of the receive signals in the arrangement of FIG. 5.

FIG. 6 exemplarily illustrates the time signals of the arrangement of FIG. 5. What is shown is a waveform of the receive amplitude normalized to the maximum as a function of time t for the transmitter of FIG. 5 which moves in parallel to the x axis ($z=z_0$) at a constant speed v. The two antenna elements are located on the x axis and are centered around the coordinate origin, i.e. are at equal distances to it.

When the transponder as the transmitter is read out at different positions and, thus, at different times (this means that the transponder has been identified and its identification is known), an analysis of the time signal allows determining the time when the transponder is located in the direction θ=0° and, thus, at a certain position—i.e. the detection region—along the transport path.

The receive signal in an odd mode (broken line) is minimal at this time of passing the detection region, whereas it is maximal in an even mode (continuous line). Thus, the transponder can be differentiated from a subsequent transponder which is also read out, at this time of passing the detection region, since the signal of the following transponder is received both in an even mode and in an odd mode. The transponder which consequently responds from the direction θ=0° and the signal of which can be received only in an even mode, will consequently be the selected transponder This result can be used to control and check the flow of the objects on, for example, a conveyor belt or when passing a gate.

The time when the transponder is located along the plane with a co-elevation angle θ=0°, can alternatively also be read from the even mode. The signal sent out by the transmitter is received at this position at a maximum amplitude.

Figure 7:
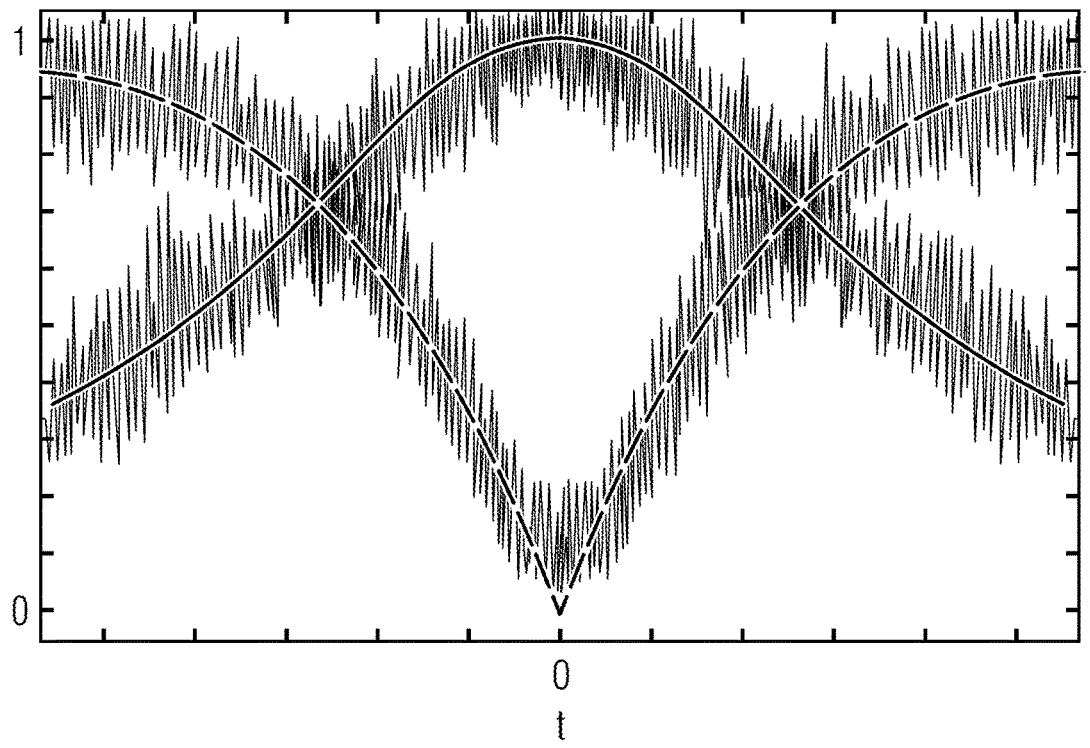
FIG. 7 shows the waveforms of FIG. 6 with noise superimposed.

For a practical realization, however, the insecurities caused by superimposed noise should be kept in mind. FIG. 7 illustrates the waveform of the receive signals of FIG. 6 in an even mode (continuous line) and an odd mode (broken line) with superimposed noise starting from a signal-to-noise ratio of ρ=20 dB.

Due to the wide radiation beam in an even mode, the noise has stronger an effect on the signal maximum in the detection region so that, when searching for the maximum, greater an insecurity occurs. Due to the relatively narrow minimum in an odd mode, the same can also be found with lower insecurity in the case of superimposed noise.

Figure 8:
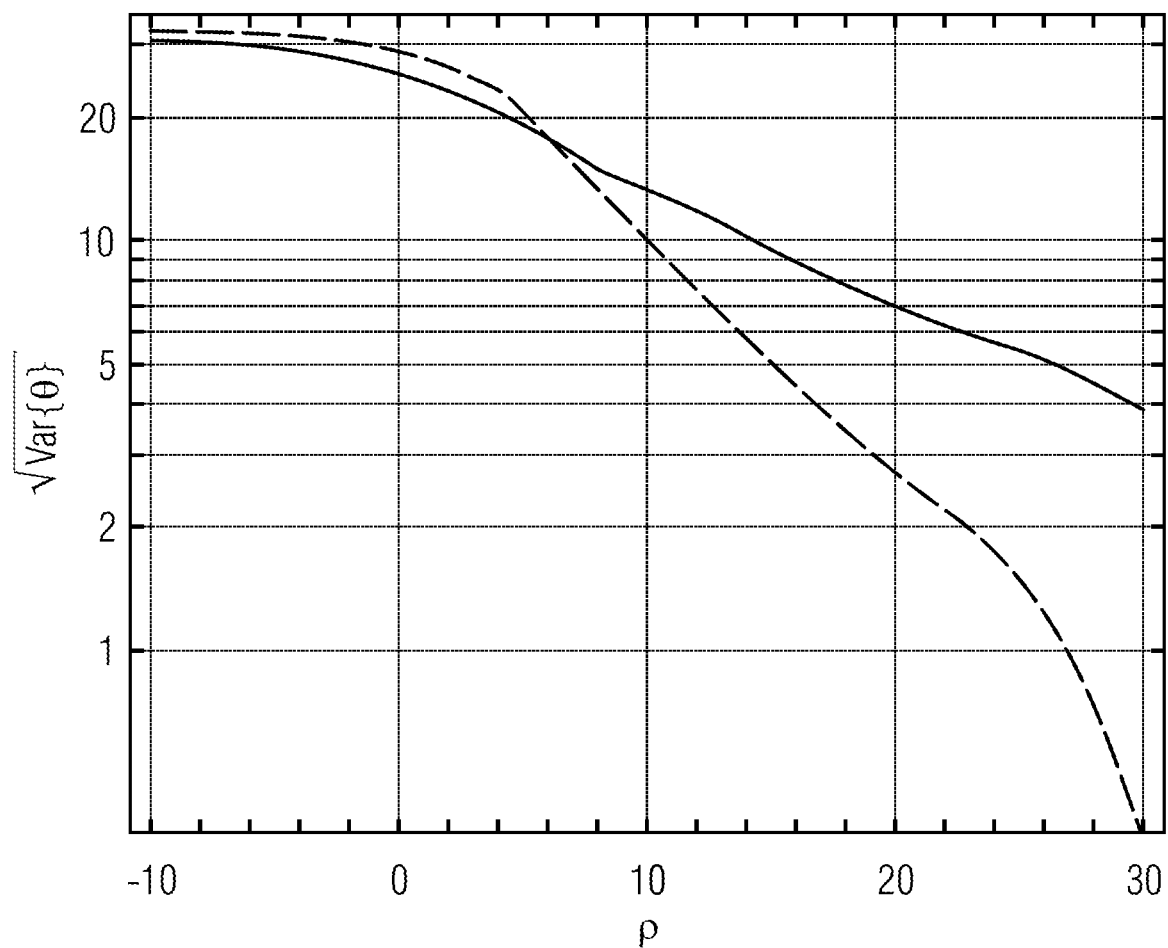
FIG. 8 shows a dependence of the standard deviation √Var (θ) of the estimated angle of incidence θ on the signal-to-noise ratio ρ.

In order to illustrate this, FIG. 8 exemplarily shows the standard deviation established of the angle of incidence θ established for varying signal-to-noise ratios for the setup according to FIG. 5. With an increasing signal-to-noise ratio ρ (illustrated on the x axis in dB), the insecurity when searching for minimums in an odd mode (broken line) decreases quickly, whereas the search for a maximum in an even mode (continuous line) shows considerably higher insecurities with high signal-to-noise ratios ρ. Thus, the standard deviation √Var (θ) of the estimated angle of incidence θ in degrees (°) is plotted on the y axis. Thus, for this example, the transponder moves at a constant speed of 3 m/s. The standard deviation was established over 10 000 test values per signal-to-noise ratio value ρ. Here, $z_0$=5 m.

The realization of the principle of even mode and odd mode feeding is based on a feed network providing the feed vectors used. The directional characteristics $\vec{C}_i$ associated to the input ports in accordance with equation (1) thus correspond to the directional characteristics of the eigenmodes $\vec{C}_j^{(m)}$, wherein the feed network is an eigenmode network, wherein, in this implementation, m=n. This means that one signal output for outputting the respective signals received is available per antenna element 10.

Figure 9:
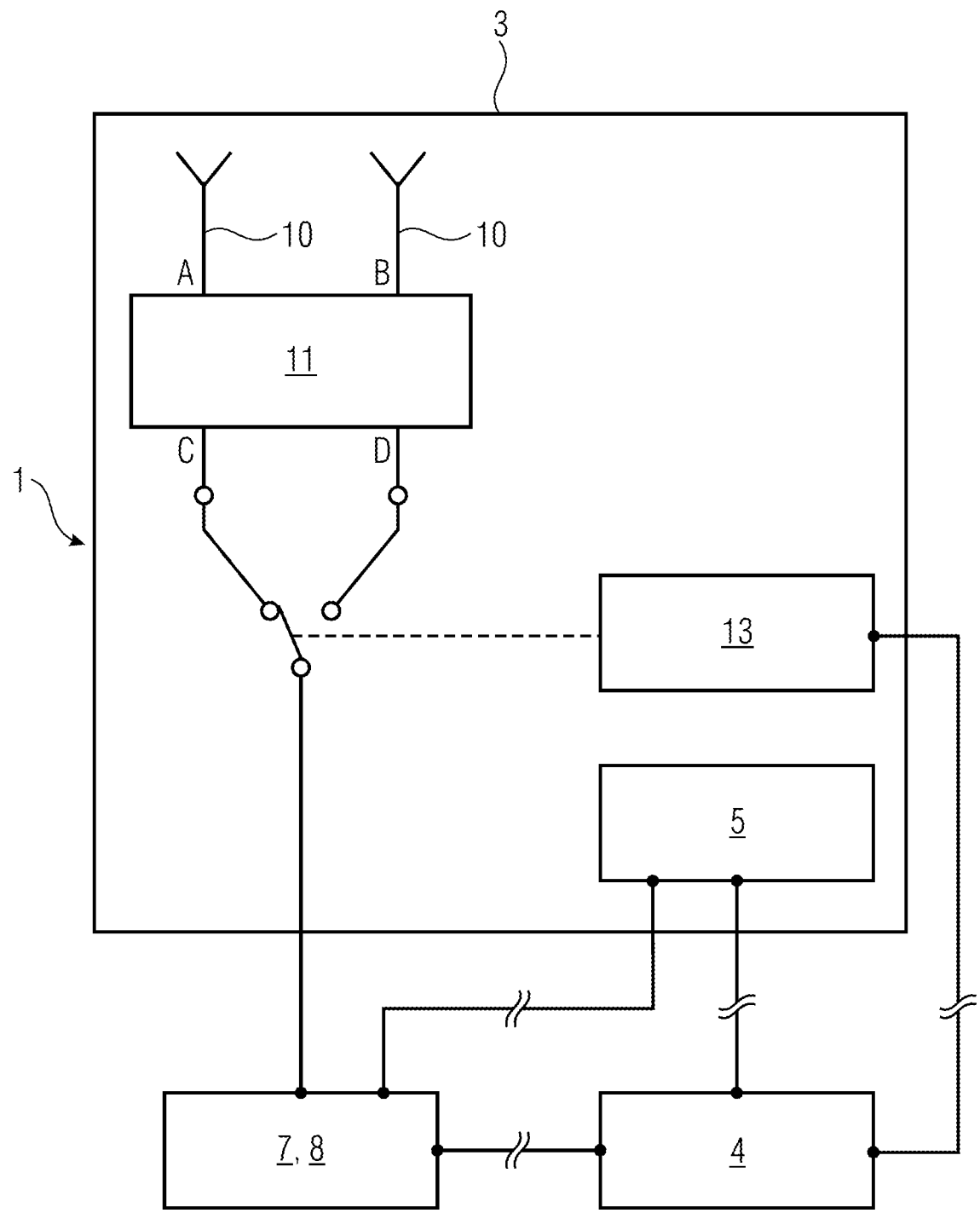
FIG. 9 shows a schematic illustration of another implementation of the inventive device.

A possible implementation of the inventive device 1 having two antenna elements 10 is shown in FIG. 9. The antenna array of the two antenna elements 10 (referred to by A and B) is connected to an eigenmode network as a feed network 11. The inputs (referred to by C and D) of the feed network 11 are selectable via a radio-frequency signals switch. The input of the switch is connected to the RFID reader which in this case serves as the signal processing device 7. Thus, the RFID reader also includes the signal source 8 so that the RFID reader provides the excitation signal for the transponders and evaluates the response signals thereof. Switching the inputs of the feed network 11 is done using control logic 13 which in this case is part of the antenna device 3. The inputs C and D of the feed networks 11 are inputs for the RF signal as an excitation signal of the signal processing device 7. In addition, they are the outputs for the signals received by the antenna elements 10. Thus, a directional characteristic, i.e. either even mode or odd mode, is associated to each input so that the switch allows changing between the two directional characteristics.

Reading out the transponder and, consequently, receiving the signals is regulated via a control device 4, acting on the control logic 13. In the implementation shown, the transponder signals are read out alternatingly in an even mode and odd mode. With the RSSI values made available by the RFID reader 7 as values for the amplitude of the signals received, the associated time signals of even mode and odd mode can be established for each transponder. Starting there, the time when the respective transponder crosses the z axis θ=0° is established in the data processing device 5. In one implementation, the data processing device 5 particularly establishes the angle of incidence of the signals received.

The data processing device 5 here also is a component of the antenna device 3. In another implementation—no illustrated here—the control device 4 is also part of the antenna device 3 so that the device 1 in this implementation consists of two elements: antenna device 3 and RFID reader 7.

The separation into control logic 13, control device 4 and data processing device 5 here is to be understood to be relating to the functions thereof. Different implementations may be realized.

Figure 10:
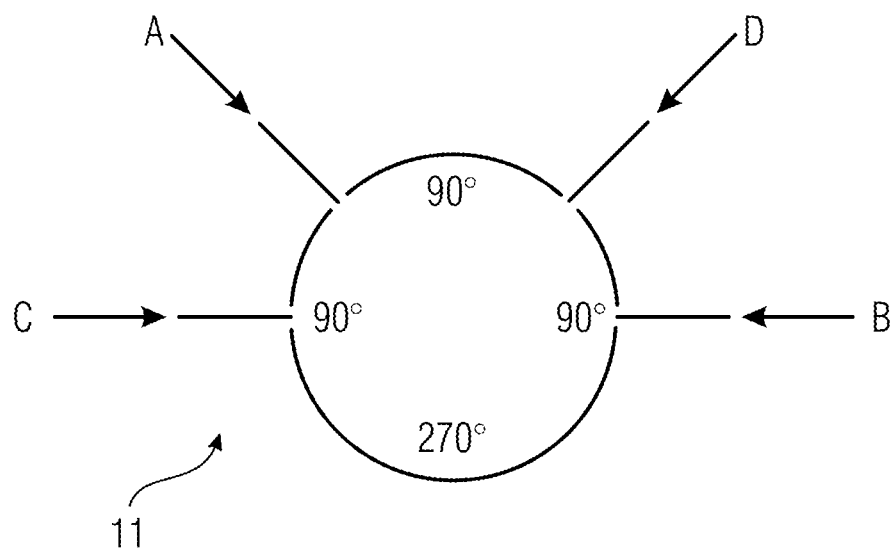
FIG. 10 shows a functional illustration of a ring coupler as an example of a feed network.

One implementation of an eigenmode network as a feed network 11 is shown in FIG. 10 for the antenna array of FIG.

2 consisting of two antenna elements (antenna A and antenna B). In one implementation, this is a ring coupler (rat-race coupler) which, depending on the port fed (i.e. the respective input of the feed network in the direction of the RFID reader in accordance with FIG. 9, referred to here by C for odd mode input and D for even mode input), makes available an even mode signal or odd mode signal. Such a ring coupler is particularly used when realizing an eigenmode network.

Figure 11:
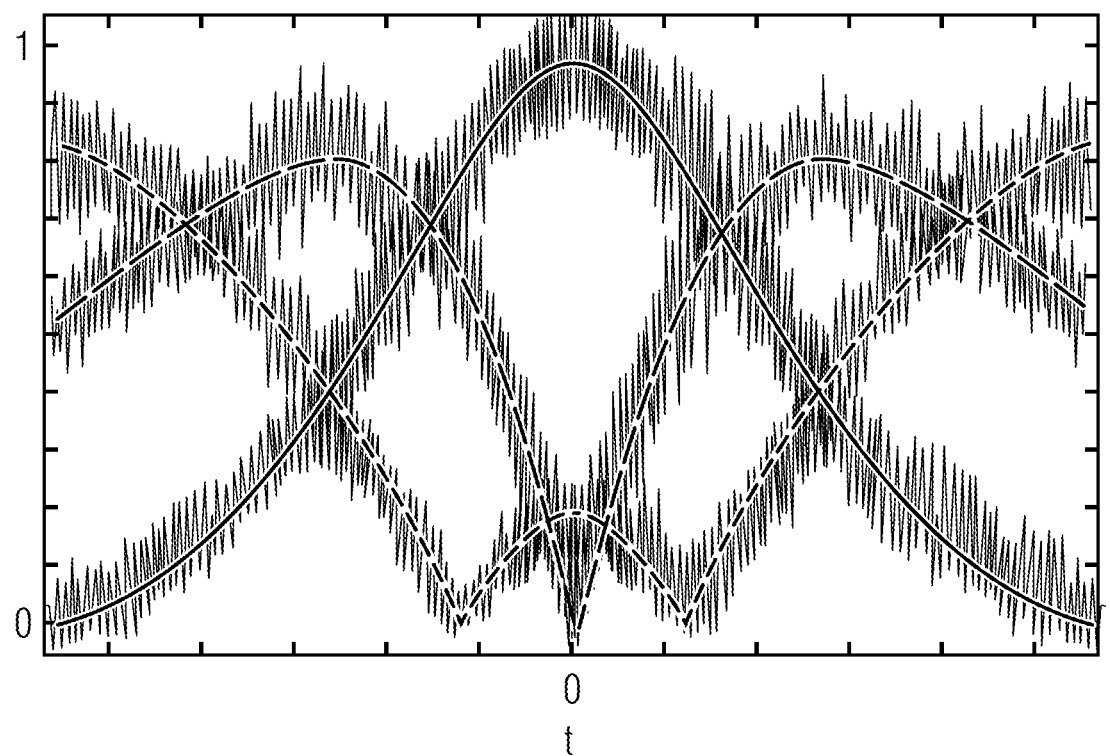
FIG. 11 shows a schematic illustration of the waveforms of the amplitudes of the receive signals when using three antenna elements with three modes.

The principle of eigenmode feeding may be applied to arrays of any number of antenna elements:

FIG. 11 exemplarily shows the signals of an antenna device comprising three antenna elements (cf. FIG. 1). The three antenna elements are located on the x-axis and are centered around the coordinate origin. Three modes can be seen. The time signals (time t on the x-axis, wherein t=0 is the point of passing the detection region, and with the receive amplitude normalized to the maximum of the y-axis) here are illustrated to be superimposed by noise. The signal-to-noise ratio is $\rho=20$ dB.

In an even mode (continuous line), all three antenna elements are fed in phase. The corresponding directional characteristic thus exhibits a maximum along an angle $\theta=0°$, which decreases on both sides.

In an odd mode (broken line with longer sub-marks), the two outer elements are fed in opposite phases and at equal amplitude. The result is a minimum or zero which increases laterally to a maximum, which is smaller than the maximum of an even mode, and then decreases again, along the axis with an angle $\theta=0°$.

In the third mode (broken line with shorter sub-marks), respective neighboring elements are fed in opposite phases. The results are, symmetrically around the z-axis, two zeros in the radiation diagram with a small maximum around the region of an angle $\theta=0°$. The two zeros increase laterally.

The consideration here is limited to the upper half plane $z \geq 0$.

Using the two additional zeros of the third mode, the point in time when a transponder passes the z-axis can be determined more precisely with superimposed noise when compared to the two-element array. For reasons of plausibility, the estimated time of the minimum in the odd mode signal has to occur between the times for the minimums in the signal of the third mode.

In addition, in the three-element array, due to the grater aperture, the zeros in the odd mode are sharper than in the two-element array, wherein an equal distance between the antenna elements is entailed here.

Figure 12:
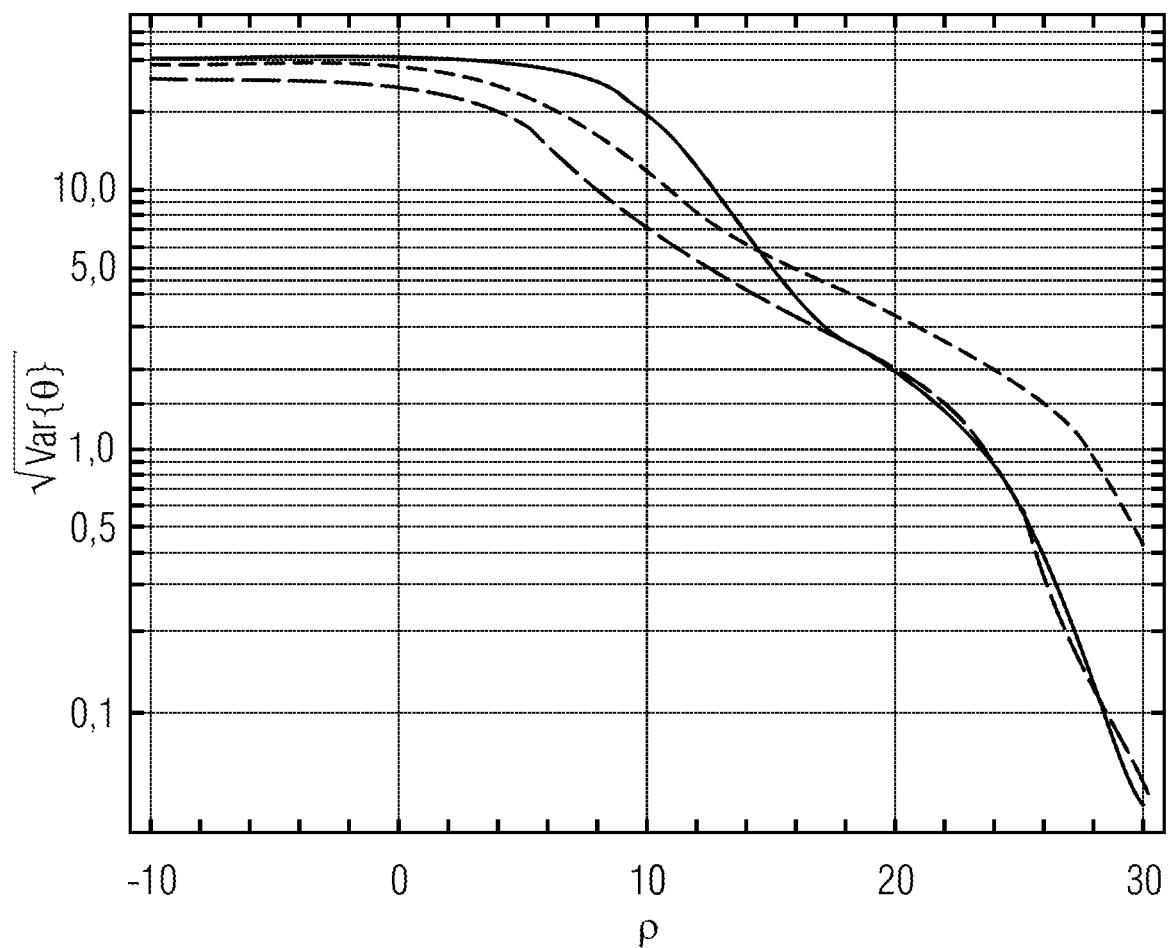
FIG. 12 shows an illustration of the dependence of a standard deviation of the angle of incidence θ established on noise for an antenna device with three antenna elements.

FIG. 12 shows the standard deviation $\sqrt{\text{Var}\{\theta\}}$ f the estimated angle of incidence $\theta$ as a function of the signal-to-noise ratio $\rho$ having been established using the signals in the odd mode (continuous line) and using the signals in the odd mode and third mode (continuous thick line). The result for the odd mode of the two-element array is plotted for comparison (broken thin line, cf. FIG. 8).

The transponder here moves in parallel to the x-axis ($z=z_0$) with a constant speed v=3 m/s for the values established. The antenna elements are located on the x-axis and are centered around the coordinate origin. The standard deviation was established over 10,000 test values per $\rho$ value. In addition, $z_0=5$ m.

The comparison of the variances between a two-element and a three-element array shows that the combination of odd mode and third mode exhibits smaller a standard deviation than the odd mode of the two-element array.

With signal-to-noise ratios of less than 13 dB, the odd mode of the three-element array results in higher standard deviations than the odd mode of the two-element array. In the three-element array, with an increasing value for p, the standard deviation of the odd mode approximates the standard deviation which results from the combination of odd mode and third mode. This is due to the fact that the insecurity when estimating the angle of incidence and, thus, the scattering around the expected value decrease. The probability of the minimum in the time signal of the odd mode not to occur between the minimums of the third mode is decreasing.

The invention is to be summarized below using one implementation: a transponder as a transmitter is detected based on the search for minimums in the time signal of at least one receive mode of a multi-beam antenna.

When using an RFID reader which provides RSSI values for the signals received, the following advantages will result:

When using a computing device which may be accommodated in the multi-beam antenna, a single HF path between the multi-beam antenna and the RFID reader is sufficient for detecting a transponder in a certain direction. This also allows using RFID readers comprising only one port as output and/or input. These are cheaper than RFID readers having several ports.

Additionally, there is the advantage that no additional infrastructural components are used for switching or computing since, in this implementation, switching and determining the position are covered functionally by the multi-beam antenna itself.

The number of antenna elements and, consequently, the number of eigenmodes may be selected as desired and is not dependent on the RFID reader. With an increasing number of elements, sharper zeros can be caused and plausibility checks performed. The insecurity caused by superimposed noise may thus be reduced.

This, however, applies in analogy for other signal processing devices which provide a value for the signal strength of the signals received.

In contrast to low-range antennas as are, for example, used in known technology for detecting RFID transponders, the following advantages result:

The antenna device in the form of a multi-beam antenna can be positioned more flexibly since it is not limited to a low range. Thus, the multi-beam antenna can be used in different scenarios.

Additionally, smaller a transmitting power of the RFID reader is sufficient.

Technical fields of application are, for example, in the fields of logistics or production with flow control of importing or exporting goods or, for example, in the field of sorting luggage. In particular, flow control is also possible in transport means, like conveyer belts, transport vehicles. Further applications relate to automated access control, like person identity check in hospitals, or determining a speed as a throughput speed.

Although some aspects have been described in the context of a device, it is clear that these aspects also represent a description of the corresponding method, such that a block or element of a device also corresponds to a respective method step or a feature of a method step. Analogously, aspects described in the context of or as a method step also represent a description of a corresponding block or item or feature of a corresponding device. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software or at least partly in hardware or at least partly in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises a device or a system configured to transfer a computer program for performing one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU), or hardware specific for the method, such as ASIC, or a microprocessor, like in the form of an ARM architecture.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] UHF RFID Low Range-Antenne (LoRa), data sheet, Kathrein company.
[2] UHF RFID Ultra Low Range-Antenne, data sheet, Kathrein company.
[3] C. Volmer et al., "An Eigen-Analysis of Compact Antenna Arrays and Its Application to Port Decoupling", IEEE transactions on antennas and propagation, vol. 56, no. 2, pp. 360-370, 2008.

The invention claimed is:

1. A device for determining at least one piece of information on a position of at least one transmitter,
    comprising an antenna device and a data processing device,
    wherein the antenna device is configured to receive signals emanating from the transmitter,
    wherein the antenna device comprises at least a distinguished directional characteristic,
    wherein the distinguished directional characteristic relates to a set of spatially different receive sensitivities of the antenna device,
    wherein the distinguished directional characteristic comprises a plurality of sensitivity minima, wherein each sensitivity minimum of the sensitivity minima is associated to a spatial detection region of a plurality of detection regions,
    wherein the data processing device is configured to evaluate at least signals received from the antenna device with the distinguished directional characteristic in order to determine the one piece of information on the position of the transmitter relative to the detection regions,
    wherein the data processing device is configured to evaluate the signals received from the antenna device at different times, as regards the position of the transmitter relative to the plurality of detection regions,
    wherein the device comprises a data storage,
        wherein the data processing device is configured to store data associated to the signals received at different times in the data storage, and
        wherein the data processing device is configured to establish from the data stored in the data storage that time when the transmitter passes one of the detection regions.

2. The device according to claim 1,
    wherein the antenna device comprises several different directional characteristics, wherein the directional characteristics each relate to a set of spatially different receive sensitivities of the antenna device,
wherein the device comprises a control device, and
wherein the control device is configured to switch several directional characteristics for receiving signals emanating from the transmitter.

3. The device according to claim 2,
wherein the control device is configured to switch at least one comparative directional characteristic as one of the directional characteristics of the antenna device,
wherein the comparative directional characteristic comprises at least one sensitivity maximum associated to the spatial detection region, and
wherein the data processing device is configured to check, starting from the signals received from the antenna device with the comparative directional characteristic, the one piece of information on the position of the transmitter relative to the detection region.

4. The device according to claim 1,
wherein the distinguished directional characteristic comprises several sensitivity minimums associated to different spatial detection regions.

5. The device according to claim 1,
the device comprising a signal processing device, and
wherein the signal processing device is configured to process the signals received from the antenna device and establish a respective amplitude value of a field strength of the signal received.

6. The device according to claim 5,
wherein the signal processing device is an RFID reader which generates a respective "received signal strength indication" (RSSI) value as an amplitude value of the field strength of the signals received.

7. The device according to claim 1,
the device comprising a signal source,
wherein the signal source is configured to generate an excitation signal, and
wherein the antenna device is configured to radiate the excitation signal.

8. The device according to claim 1,
wherein the detection region is a plane.

9. The device according to claim 1,
wherein the antenna device is implemented as a multi-beam antenna.

10. The device according to claim 1,
wherein the antenna device comprises several antenna elements.

11. The device according to claim 10,
wherein the antenna device comprises two antenna elements,
wherein the device comprises a control device, and
wherein the control device is configured to switch the two antenna elements alternatingly in an even mode and odd mode.

12. The device according to claim 2,
wherein the antenna device comprises a feed network, and
wherein the feed network is configured to cause different directional characteristics of the antenna device.

13. A method for determining at least one piece of information on a position of a transmitter, the method comprising the steps of:
receiving signals emanating from the transmitter with a distinguished directional characteristic of an antenna device, wherein the distinguished directional characteristic relates to a set of spatially different receive sensitivities of the antenna device, wherein the distinguished directional characteristic comprises a plurality of sensitivity minima for receiving signals, wherein each sensitivity minimum of the plurality of the sensitivity minima is associated with a detection region of a plurality of detection regions;
evaluating, by using a data processing device, at least signals received from the antenna device with the distinguished directional characteristic in order to determine the one piece of information on the position of the transmitter relative to the plurality of the detection regions, wherein the data processing device is used for evaluating the signals received from the antenna device at different times, as regards the position of the transmitter relative to the plurality of detection regions;
storing data associated to the signals received at different times in a data storage; and
using the data processing device for establishing from the data stored in the data storage that time when the transmitter passes one of the detection regions.

* * * * *